(12) United States Patent
Karumuri

(10) Patent No.: US 9,261,367 B2
(45) Date of Patent: Feb. 16, 2016

(54) HUMAN-LIKE GLOBAL POSITIONING SYSTEM (GPS) DIRECTIONS

(71) Applicant: Facebook, Inc., Menlo Park, CA (US)

(72) Inventor: Ram Suman Karumuri, Bellevue, WA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 14/679,618

(22) Filed: Apr. 6, 2015

(65) Prior Publication Data

US 2015/0211862 A1    Jul. 30, 2015

Related U.S. Application Data

(63) Continuation of application No. 14/561,097, filed on Dec. 4, 2014, which is a continuation of application No. 13/926,392, filed on Jun. 25, 2013, now Pat. No. 8,954,279.

(51) Int. Cl.
| | |
|---|---|
| *G01S 19/13* | (2010.01) |
| *H04L 12/58* | (2006.01) |
| *H04L 29/08* | (2006.01) |
| *G01C 21/00* | (2006.01) |
| *G01C 21/36* | (2006.01) |

(52) U.S. Cl.
CPC ............ *G01C 21/00* (2013.01); *G01C 21/3641* (2013.01); *G01S 19/13* (2013.01); *H04L 51/32* (2013.01); *H04L 67/2823* (2013.01)

(58) Field of Classification Search
CPC ................................ G01C 21/00; G01S 19/13
USPC .......................................................... 701/540
See application file for complete search history.

(56) References Cited

U.S. PATENT DOCUMENTS

| | | | |
|---|---|---|---|
| 8,738,288 B2 * | 5/2014 | Pfeifle et al. | 701/410 |
| 2007/0168118 A1 * | 7/2007 | Lappe et al. | 701/207 |
| 2008/0262717 A1 * | 10/2008 | Ettinger | 701/206 |
| 2014/0005924 A1 * | 1/2014 | Letz | 701/424 |
| 2014/0189888 A1 * | 7/2014 | Madhok et al. | 726/29 |
| 2014/0309932 A1 * | 10/2014 | Chen et al. | 701/527 |
| 2014/0310739 A1 * | 10/2014 | Ricci et al. | 725/28 |
| 2015/0142313 A1 * | 5/2015 | Haberman | 701/533 |

* cited by examiner

*Primary Examiner* — Jerrah Edwards
*Assistant Examiner* — Frederick Brushaber
(74) *Attorney, Agent, or Firm* — Baker Botts L.L.P.

(57) ABSTRACT

In one embodiment, a method includes receiving a request for a route from a first geolocation to a second geolocation; calculating the route from the first geolocation to the second geolocation; identifying one or more logged paths of a user that coincide with at least a portion of the route; updating one or more navigation instructions for the route based on the identified logged paths of the user; and providing the updated navigation instructions.

36 Claims, 5 Drawing Sheets

HUMAN-LIKE GLOBAL POSITIONING SYSTEM (GPS) DIRECTIONS

PRIORITY

This application is a continuation under 35 U.S.C. §120 of U.S. patent application Ser. No. 14/561,097, filed 4 Dec. 2014, which is a continuation under 35 U.S.C. §120 of U.S. patent application Ser. No. 13/926,392, filed 25 Jun. 2013.

TECHNICAL FIELD

This disclosure generally relates to mobile devices.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

A mobile computing device—such as a smartphone, tablet computer, or laptop computer—may include functionality for determining its location, direction, or orientation, such as a GPS receiver, compass, gyroscope, or accelerometer. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

In particular embodiments, a mobile computing device may log location data of user, and infer paths traveled by the user. The inferred paths may be ranked according by most-frequently-traveled or longest paths, and the ranked inferred paths may be provided to the user for confirmation. Upon confirmation by the user, the inferred paths may be stored. As the mobile computing device is instructed by the user to provide directions from point A to point B, the mobile computing device may calculate a route from point A to point B and provide a set of turn-by-turn navigation instructions. In particular embodiments, the set of navigation instructions may be modified by replacing the navigation instructions of at least some of the route with abbreviated navigation instructions of one or more stored inferred paths. For example, if the route includes segments A-C, C-D, and D-A, and the segment C-D that coincides with a stored path, the set of navigation instructions may include detailed turn-by-turn navigation instructions for the segments A-C and D-A, while giving an abbreviated navigation instruction for the coinciding segment C-D (e.g., "Now drive to D.").

DESCRIPTION OF EXAMPLE EMBODIMENTS

Figure 1:
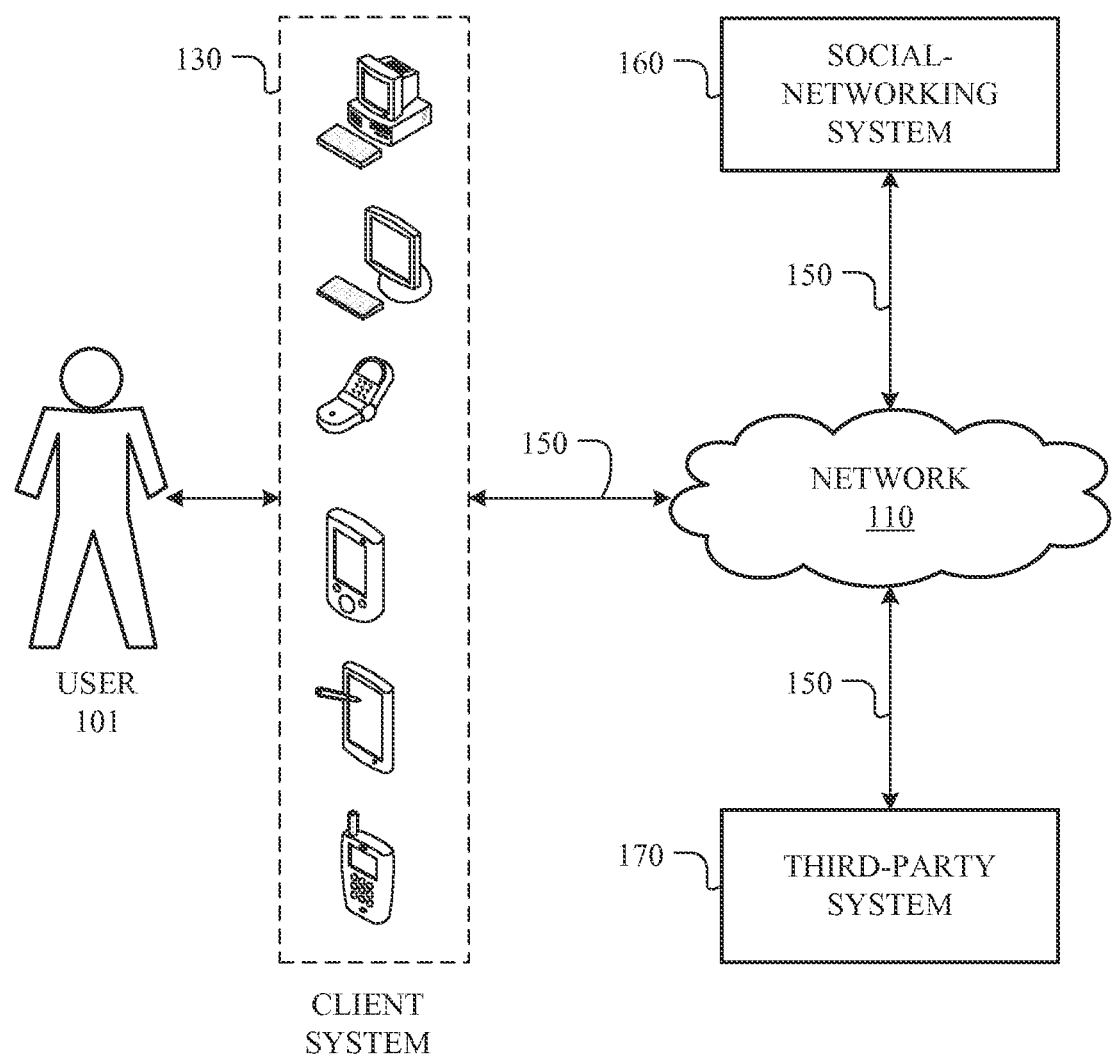
FIG. 1 illustrates an example network environment associated with a social-networking system.

FIG. 1 illustrates an example network environment 100 associated with a social-networking system. Network environment 100 includes a user 101, a client system 130, a social-networking system 160, and a third-party system 170 connected to each other by a network 110. Although FIG. 1 illustrates a particular arrangement of user 101, client system 130, social-networking system 160, third-party system 170, and network 110, this disclosure contemplates any suitable arrangement of user 101, client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of users 101, client systems 130, social-networking systems 160, third-party systems 170, and networks 110, this disclosure contemplates any suitable number of users 101, client systems 130, social-networking systems 160, third-party systems 170, and networks 110. As an example and not by way of limitation, network environment 100 may include multiple users 101, client system 130, social-networking systems 160, third-party systems 170, and networks 110.

In particular embodiments, user 101 may be an individual (human user), an entity (e.g., an enterprise, business, or third-party application), or a group (e.g., of individuals or entities) that interacts or communicates with or over social-networking system 160. In particular embodiments, social-networking system 160 may be a network-addressable computing system hosting an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include an authorization server (or other suitable component(s)) that allows users 101 to opt in to or opt out of having their actions logged by social-networking system 160 or shared with other systems (e.g., third-party systems 170), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users of social-networking system 30 through blocking, data hashing, anonymization, or other suitable techniques as appropriate. In particular embodiments, third-party system 170 may be a network-addressable computing system that can host websites or applications. Third-party system 170 may generate, store, receive, and send third-party system data, such as, for example, web pages, text, images, video, audio, or applications. Third-party system 170 may be accessed by the other components of network environment 100 either directly or via network 110. In particular embodiments, one or more users 101 may use one or more client systems 130 to access, send data to, and receive data from social-networking system 160 or third-party system 170. Client system 130 may access social-networking system 160 or third-party system 170 directly, via network 110, or via a third-party system. As an example and not by way of limitation, client system 130 may access third-party system 170 via social-networking system 160. Client system 130 may be any suitable computing device, such as, for example, a personal computer, a laptop computer, a cellular telephone, a smartphone, or a tablet computer.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, social-networking system 160 may be a network-addressable computing system that can host an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include one or more servers. Each server may be a unitary server or a distributed server spanning multiple computers or multiple datacenters. The servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by the servers. In particular embodiments, social-networking system 160 may include one or more data stores. The data stores may be used to store various types of information. In particular embodiments, the information stored in the data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in the data store.

In particular embodiments, social-networking system 160 or third-party system 170 may determine the current location of client system 130. As an example and not by way of limitation, a route guidance application executed on client system 130 may send location data to social-networking 160 or third-party 170 system at pre-determined intervals of time through network 110 using a wireless communication protocol such as for example, WI-FI or third-generation mobile telecommunications (3G). In particular embodiments, social-networking system 160 or third-party system 170 may poll or "ping" an application executed on client system 130 for location data by transmitting an activation signal. In particular embodiments, location data of user 101 sent to social-networking 160 or third-party 170 system may be stored in one or more data stores described above. In particular embodiments, a program (or a process) executed by one or more processors of social-networking 160, third-party 170, client system 130, or any combination thereof, may access the location data of the user 101.

In particular embodiments, one or more paths traveled by user 101 may be inferred based at least in part on the logged location data of user 101 captured at pre-determined intervals over a pre-determined period of time. As an example and not by way of limitation, paths traveled by user 101 may be inferred by applying a machine learning algorithm such as for example a neural network, support-vector machine (SVM), belief propagation, k-means algorithm, or hierarchical clustering, to the logged location data of user 101. In particular embodiments, one or more inferred paths may comprise a starting or ending geolocation. As an example and not by way of limitation, starting or ending geolocations may correspond to a geolocation associated with a user node (e.g. a residence) or concept node (e.g. place of business) of a social-graph described below. In particular embodiments, the inferred paths of user 101 may be associated with one or more abbreviated instructions that may include the ending geolocation of the inferred path. In particular embodiments, each inferred path may comprise an abbreviated navigation instruction to the ending geolocation. As an example and not by way of limitation, the abbreviated navigation instruction of an inferred path to a work location of the user may be a brief instruction to drive to the geolocation of the workplace (e.g. "Drive toward your office"). Although this disclosure describes particular methods of inferring paths traveled by the user, this disclosure contemplates any suitable method of inferring a path traveled by a user, such as for example, the user manually prompting logging of location data while traveling on a particular path.

In particular embodiments, the inferred paths of user 101 may be ranked based at least in part on one or more criteria. As an example and not by way of limitation, paths may be ranked based at least in part on their respective lengths. For example, longer paths may be assigned a higher ranking relative to the ranking of shorter paths. As another example, inferred paths may be ranked based at least in part on respective frequencies the inferred paths are traveled by user 101. For example, an inferred path that was traveled 8 times by user 101 may be assigned a higher ranking relative to another inferred path that was traveled 3 times by user 101. As another example, the inferred paths may ranked based at least in part on social proximities between the user or concept nodes associated with the start or end geolocations and user 101. For example, a particular inferred path may ranked higher relative to other recorded paths if the particular recorded path's ending geolocation associated with a first-degree connection of user 101, such as for example a residence associated with a first-degree "friend" of user 101. As another example, may rank a particular recorded path higher relative to other recorded paths if the particular recorded path's ending geolocation corresponds to a user or concept node having an affinity coefficient (with user 101) above a pre-determined threshold value.

In particular embodiments, one or more top ranked paths may be presented to user 101 for confirmation. As an example and not by way of limitation, client system 130 may present the top ranked paths to user 101 as selectable icons (or selectable paths) in a graphical-user interface (GUI) displayed on a display. User 101 may confirm particular paths by selecting their corresponding icons on the GUI. In particular embodiments, user 101 may confirm one or more top ranked paths by setting one or more configuration settings of client system 130. In particular embodiments, user 101 may assign one or more top ranked paths as the user's favorite paths.

In particular embodiments, one or more top ranked paths (e.g., top 5 ranked paths) may be stored in a data store. As an example and not by way of limitation, top ranked paths that are confirmed by the user may be stored in a data store. Furthermore, the data store may be a local storage component of client system 130 (e.g. a flash memory or a hard disk drive of the computing device), a data store of social-network 160 or third-party 170 system, or any combination thereof. In particular embodiments, the top ranked paths stored in the data store may be synchronized among different client systems 130. In particular embodiments, client system 130 may store in a data store top ranked paths together with a user identifier of the user. Client system 130 (or another navigation device) may retrieve from the data store top ranked paths specific for a requesting user 101 based on the requesting user's user identifier.

Figure 2:
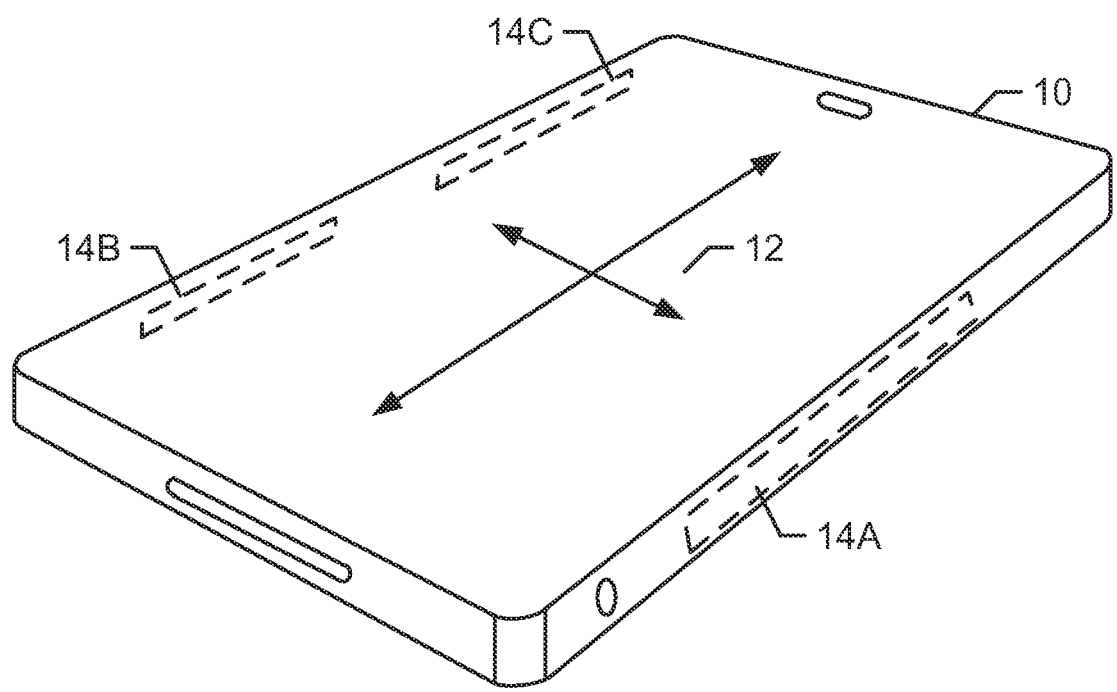
FIG. 2 illustrates an example mobile computing device.

FIG. 2 illustrates an example mobile computing device. As described above, a client system may be a mobile computing device 10. In particular embodiments, mobile computing device 10 may be a computing device, such as for example a smartphone, a tablet computer, or laptop computer, with capabilities determining location data based on global positioning system (GPS) signals, cellular triangulation, wireless hotspots, or any suitable methods for determining location data, or a stand-alone navigation device such as a portable GPS navigation system (e.g. developed by GARMIN or TOMTOM). In particular embodiments, mobile computing device 10 may be included in an in-car (e.g. dashboard) navigation system of a vehicle. In particular embodiments, a route guidance application executed on mobile computing device 10 may send location data to a social-networking or third-party system at pre-determined intervals. In particular embodiments, an application may transmit location data to the social-networking or third-party system in response receiving an activation signal, as described above. In particular embodiments, the location service of mobile computing device 10 may use one or more methods of location determination, such as for example, using the location of one or more cellular towers, crowd-sourced location information associated with a WI-FI hotspot, or a GPS function of mobile computing device 10. As an example and not by way of limitation, the application may use GPS data as the primary source of location information depending at least in part on whether mobile computing device 10 is able to acquire GPS data within a pre-determined period of time. As another example, if mobile computing device 10 is unable to acquire the GPS data within the pre-determined sampling duration, the application may use the location determined using one or more cellular towers or WI-FI hotspots. Although this disclosure describes a location service using particular methods of location determination, this disclosure contemplates a location service using any suitable method or combination of methods of location detection.

In particular embodiments, a route guidance application executed on mobile computing device 10 may receive a request from a user for a route to a destination, calculate the route to the destination, and provide navigation of the route to the destination. The route may include one or more segments that each correspond to a portion of the route. Furthermore, each segment may include "turn-by-turn" or navigation instructions to an endpoint of each segment. As described below, the route guidance application executed on mobile computing device 10 may calculate a route toward a destination and identify one or more inferred paths of the user, described above, that coincide with one or more segments of the route. As an example and not by way of limitation, mobile computing device 10 may identify one or more inferred paths that coincide with one or more segments of the route based at least in part on accessing the stored inferred paths of the user described above. As described below, the route-guidance application may replace the navigation instructions the abbreviated instructions for the particular inferred paths (that the user is already familiar with), while providing more detailed instructions for rest of the route that is not modified by the particular inferred paths. For example, the calculated route may include an intermediate point that is the user's work location. In comparison, another person, knowing that the user already knows how to get to a work location of the user, may only provide a abbreviated navigation instruction (e.g. "Drive toward your home").

Figure 3:
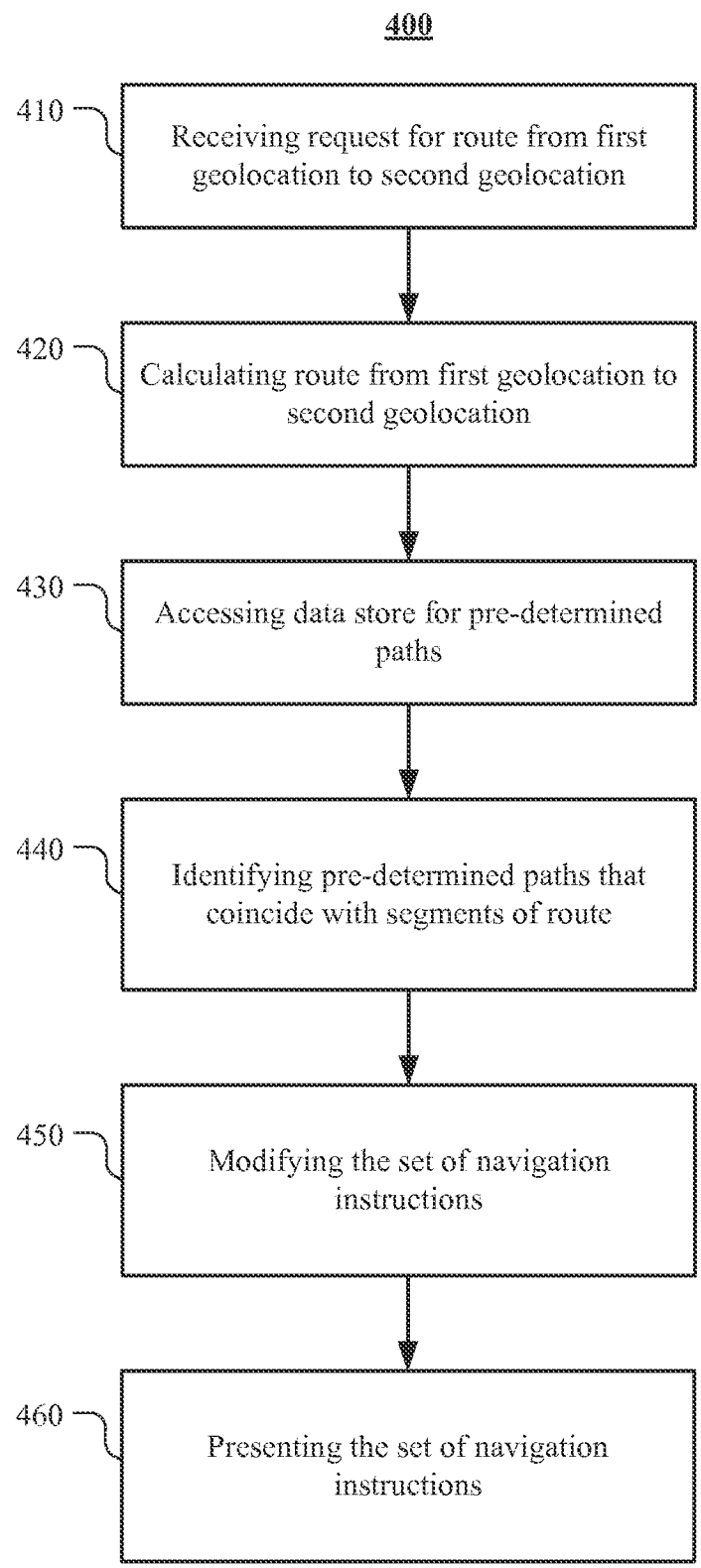
FIG. 3 illustrates an example method for providing human-like navigation instructions.

FIG. 3 illustrates an example method for providing human-like navigation instructions. The method 400 of FIG. 3 may be implemented by a computing device. The method 400 of FIG. 3 may be implemented by a program (or a process) executed by one or more processors of the computing device. The computing device may be a portable GPS navigation system, a mobile device, or a in-car navigation system as described earlier. The method 400 of FIG. 3 may begin at step 410. In particular embodiments, at step 410, the computing device may receive from a user a request for a direction from a first location to a second location. For example, the computing device may receive from the user a request for a direction to 100 University Avenue, Palo Alto, Calif. (i.e., the second location) from the user's current location (i.e., the first location). The user may provide to the computing device information for the second location by entering the second location in a graphical user interface displayed in a display of the computing device. The user may provide to the computing device information for the second location by vocal commands. The user may also provide to the computing device information for the first location (e.g., if the first location is different from the user's current location).

In particular embodiments, at step 420, the computing device may calculate a route from the first location to the second location. In particular embodiments, the route may comprise one or more segments and a set of navigation instructions of the segments. For example, the user's current location (the first location) may be 100 Main Street, Pleasanton, Calif. The second location may be 100 University Avenue, Palo Alto, Calif. The computing device may calculate a route comprising eight segments: the first segment from 100 Main Street, Pleasanton, Calif. to Sunol Boulevard; the second segment continues on Sunol Boulevard to an on-ramp onto Interstate 680 South-bound; the third segment continues on Interstate 680 South-bound to an exit to Mission Boulevard; the fourth segment continues on Mission Boulevard to an intersection with Interstate 880 South-bound; the fifth segment continues on Interstate 880 South-bound to an intersection with California State Route 237 West-bound; the sixth segment continues on California State Route 237 West-bound to an intersection with US-101 North-bound, the seventh segment continues on US-101 North-bound to an exit to University Avenue; and the eighth segment continues on University Avenue to 200 University Avenue (i.e., the second location).

In particular embodiments, at step 430, the computing device may access a data store for one or more inferred paths, as described above. In particular embodiments, the paths may be inferred based on previous location data of the user. For example, the inferred paths may be frequently traveled paths or highly ranked paths of the user, as described above. The computing device may access a local storage for the inferred paths. The computing device may access a remote data store (e.g., of a social-networking or third-party system illustrated in the example of FIG. 1) for the inferred paths. The computing device may identify the user and access a data store for inferred paths specific to the user. As described above, each inferred path may include an abbreviated navigation instruction that may include an ending geolocation associated with the user. In particular embodiments, the computing device such as an in-car navigation system may identify the driver by the driver's key fob (or by the driver's voice), and retrieve from a data store inferred paths specific to the user (e.g., based on a user identifier of the user).

At step 440, the computing device may identify one or more inferred paths that coincide with one or more of the segments. As an example and not by way of limitation, a particular pre-determined path for the user may travel from the intersection of Interstate 680 South-bound and Sunol Boulevard, continuing on Interstate 680 South-bound and Mission Boulevard to California State Route 237 Westbound, and end at the intersection of California State Route 237 West-bound and US-101 North-bound may be identified as coinciding with one or more segments of the calculated route described above. For example, the computing device may identify that the particular inferred path (that starts on Interstate 680 South-bound at the intersection with Sunol Boulevard and ends at the intersection California State Route 237 West-bound and US-101 North-bound) coincides with the second through sixth segments of the calculated route described above. In particular embodiments, a previously calculated segment may be re-calculated (e.g. adding one or more segments) if the starting or ending geolocation of the inferred path does not coincide with the start or end location of a previously calculated segment.

Step 450, by the computing device, modifies the set of navigation instructions by replacing the navigation instructions of the coinciding segments with the abbreviated navigation instruction of each identified inferred path. As an example and not by way of limitation, the navigation instructions of the second through sixth segments, described above, may be replaced with the abbreviated navigation instruction of the identified inferred path, such as for example "drive toward US-101 North-bound." At step 460, the computing device may provide the set of navigation instructions to the user. In particular embodiments, the direction from the first location to the second location may comprise one or more navigation instructions for the segments. For example, an the example modified set of navigation instructions of the route from 100 Main Street, Pleasanton, Calif. to 200 University Avenue, Palo Alto, Calif., described above, may include turn-by-turn instructions for the segments from 100 Main Street, Pleasanton, Calif. to an on-ramp onto Interstate 680 Southbound: "head south on Main Street toward Bernal Ave; turn left onto Bernal Avenue; take the first right onto first street; continue onto Sunol Boulevard; merge onto Interstate 680 South-bound toward San Jose." The modified set of navigation instructions may continue with an abbreviated navigation instruction of an identified inferred path that coincides with one or more segments: "drive toward US-101 North-bound." The modified set of navigation instructions may continue with turn-by-turn instructions from the intersection California State Route 237 West-bound and US-101 North-bound to the destination: "take the exit onto US-101 North-bound toward San Francisco; exit onto University Avenue; you have reached your destination on your left."

Particular embodiments may repeat one or more steps of the method of FIG. 3, where appropriate. Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates an example method for providing human-like navigation directions including the particular steps of the method of FIG. 3, this disclosure contemplates any suitable method for providing human-like navigation directions including any suitable steps, which may include all, some, or none of the steps of the method of FIG. 3, where appropriate. Furthermore, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3.

Figure 4:
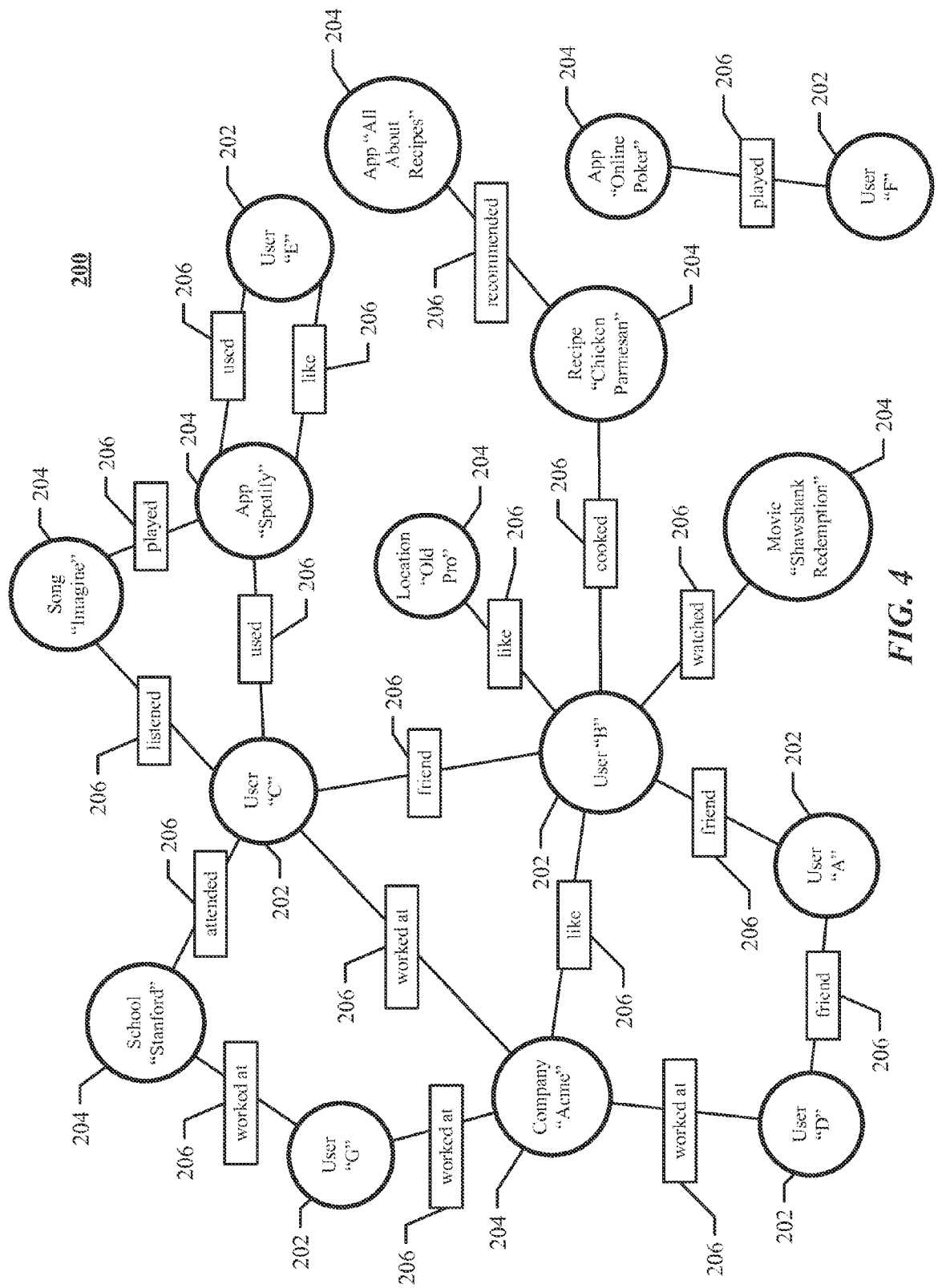
FIG. 4 illustrates an example social graph.

FIG. 4 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 4 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 130 to send to social-networking system 160 a message indicating the user's action. In response to the message, social-networking system 160 may create an edge (e.g., an "eat" edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 164. In the example of FIG. 4, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 4, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 160 may create a "listened" edge 206 and a "used" edge (as illustrated in FIG. 4) between user nodes 202 corresponding to the user and concept nodes 204 corresponding to the song and application to indicate that the user listened to the song and used the application. Moreover, social-networking system 160 may create a "played" edge 206 (as illustrated in FIG. 4) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 4 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

In particular embodiments, social-networking system 160 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 170 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 160 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part a the history of the user's actions. Coefficients may be used to predict any number of actions, which may be within or outside of the online social network. As an example and not by way of limitation, these actions may include various types of communications, such as sending messages, posting content, or commenting on content; various types of a observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 160 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 160 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 160 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 160 may calculate a coefficient based on a user's actions. Social-networking system 160 may monitor such actions on the online social network, on a third-party system 170, on other suitable systems, or any combination thereof. Any suitable type of user actions may be tracked or monitored. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular embodiments, social-networking system 160 may calculate a coefficient based on the user's actions with particular types of content. The content may be associated with the online social network, a third-party system 170, or another suitable system. The content may include users, profile pages, posts, news stories, headlines, instant messages, chat room conversations, emails, advertisements, pictures, video, music, other suitable objects, or any combination thereof. Social-networking system 160 may analyze a user's actions to determine whether one or more of the actions indicate an affinity for subject matter, content, other users, and so forth. As an example and not by way of limitation, if a user may make frequently posts content related to "coffee" or variants thereof, social-networking system 160 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 160 may calculate a coefficient based on the type of relationship between particular objects. Referencing the social graph 200, social-networking system 160 may analyze the number and/or type of edges 206 connecting particular user nodes 202 and concept nodes 204 when calculating a coefficient. As an example and not by way of limitation, user nodes 202 that are connected by a spouse-type edge (representing that the two users are married) may be assigned a higher coefficient than a user nodes 202 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social-networking system 160 may determine that the user has a higher coefficient with respect to the first photo than the second photo because having a tagged-in-type relationship with content may be assigned a higher weight and/or rating than having a like-type relationship with content. In particular embodiments, social-networking system 160 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 160 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 200. As an example and not by way of limitation, social-graph entities that are closer in the social graph 200 (i.e., fewer degrees of separation) may have a higher coefficient than entities that are further apart in the social graph 200.

In particular embodiments, social-networking system 160 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 130 of the user). A first user may be more interested in other users or concepts that are closer to the first user. As an example and not by way of limitation, if a user is one mile from an airport and two miles from a gas station, social-networking system 160 may determine that the user has a higher coefficient for the airport than the gas station based on the proximity of the airport to the user.

In particular embodiments, social-networking system 160 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 160 may provide information that is relevant to user's interests and current circumstances, increasing the likelihood that they will find such information of interest. In particular embodiments, social-networking system 160 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 160 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 160 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 170 (e.g., via an API or other communication channel), or from another suitable system. In response to the request, social-networking system 160 may calculate the coefficient (or access the coefficient information if it has previously been calculated and stored). In particular embodiments, social-networking system 160 may measure an affinity with respect to a particular process. Different processes (both internal and external to the online social network) may request a coefficient for a particular object or set of objects. Social-networking system 160 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, field 1 Oct. 2012, each of which is incorporated by reference.

Figure 5:
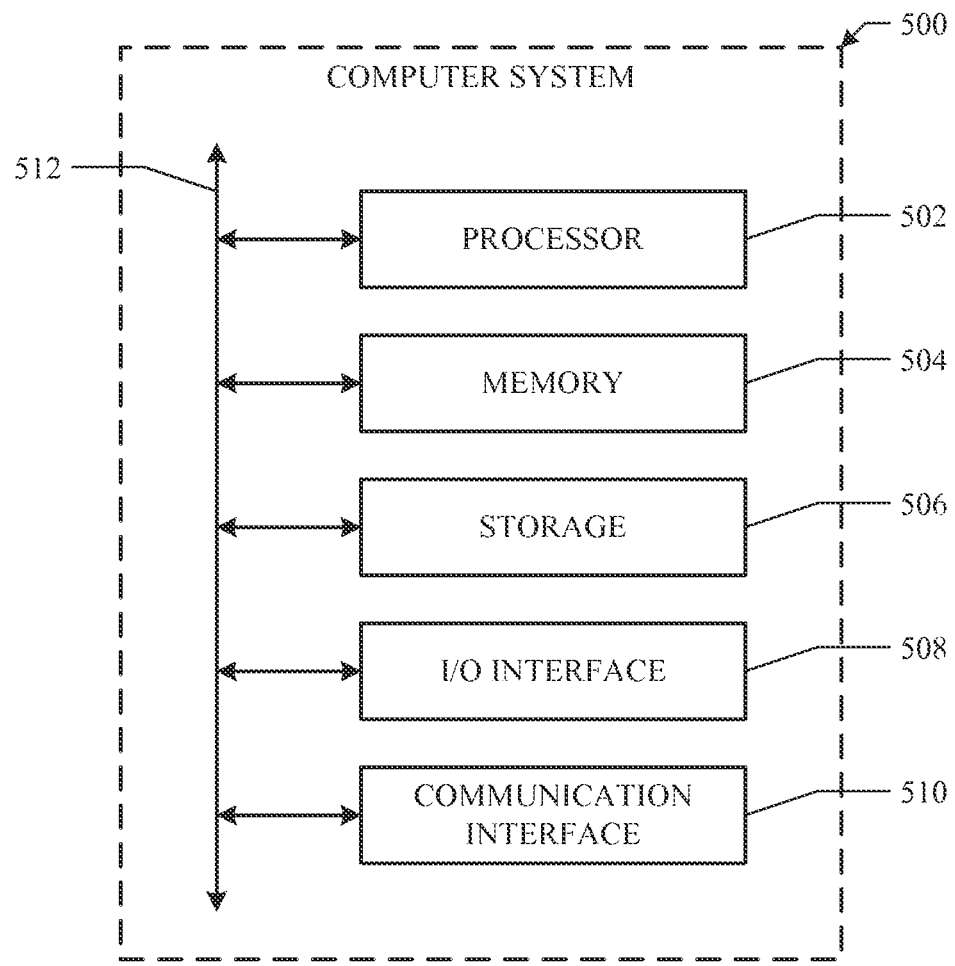
FIG. 5 illustrates an example computer system.

FIG. 5 illustrates an example computer system 500. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to a computer system may encompass a computing device, and vice versa, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
   by one or more processors of a computing device, receiving a request for a route from a first geolocation to a second geolocation;
   by one or more processors of the computing device, calculating the route from the first geolocation to the second geolocation;
   by one or more processors of the computing device, accessing a social graph comprising a plurality of nodes and a plurality of edges connecting the nodes, and each node corresponding to an object associated with a social network, wherein a geolocation associated with a user corresponds to a particular node of the social graph;
   by one or more processors of the computing device, identifying one or more logged paths of the user that coincide with at least a portion of the route, wherein one or more of the logged paths comprise the geolocation associated with the user;
   by one or more processors of the computing device, updating one or more navigation instructions for the route based on the identified logged paths of the user; and
   by one or more processors of the computing device, displaying the updated navigation instructions on a display of a client device of the user.

2. The method of claim 1, further comprising determining the logged paths based on location data of the user.

3. The method of claim 2, further comprising polling a mobile computing device of the user to obtain the previous location data.

4. The method of claim 2, wherein the location data comprises global positioning system (GPS), cellular triangulation, or wireless hotspot data received from a mobile computing device of the user.

5. The method of claim 1, further comprising replacing navigation instructions corresponding to the portion of the route with instructions related to the identified logged paths.

6. The method of claim 1, wherein a remainder of the route comprises turn-by-turn directions.

7. The method of claim 1, wherein the particular node comprises a node associated with a check-in by the user.

8. The method of claim 1, wherein the particular node comprises a node associated with information of the user.

9. The method of claim 1, wherein identifying one or more logged paths is based at least in part on an identifier of the user.

10. The method of claim 1, further comprising accessing a data store for the logged paths.

11. The method of claim 1, further comprising identifying a highest ranked logged path based on a frequency that each of the logged paths is traveled by the user.

12. The method of claim 1, wherein the receiving the request for the route comprises by the computing device, receiving the request from a route guidance application.

13. One or more computer-readable non-transitory storage media embodying software that is operable when executed to:
   receive a request for a route from a first geolocation to a second geolocation;
   calculate the route from the first geolocation to the second geolocation;
   access a social graph comprising a plurality of nodes and a plurality of edges connecting the nodes, and each node corresponding to an object associated with a social network, wherein a geolocation associated with a user corresponds to a particular node of the social graph;
   identify one or more logged paths of the user that coincide with at least a portion of the route, wherein one or more of the logged paths comprise the geolocation associated with the user;
   update one or more navigation instructions for the route based on the identified logged paths of the user; and
   displaying the updated navigation instructions on a display of a client device of the user.

14. The media of claim 13, wherein the software is further operable to determine the logged paths based on location data of the user.

15. The media of claim 13, wherein the software is further operable to replace navigation instructions corresponding to the portion of the route with instructions of the identified logged paths.

16. The media of claim 14, wherein the software is further operable to poll a mobile computing device of the user to obtain the previous location data.

17. The media of claim 14, wherein the location data comprises global positioning system (GPS), cellular triangulation, or wireless hotspot data received from a mobile computing device of the user.

18. The media of claim 13, wherein a remainder of the route comprises turn-by-turn directions.

19. The media of claim 13, wherein the particular node comprises a node associated with a check-in by the user.

20. The media of claim 13, wherein the particular node comprises a node associated with information of the user.

21. The media of claim 13, wherein identifying one or more logged paths is based at least in part on an identifier of the user.

22. The media of claim 13, wherein the software is further operable to access a data store for the logged paths.

23. The media of claim 13, wherein the software is further operable to identify a highest ranked logged path based on a frequency that each of the logged paths is traveled by the user.

24. The media of claim 13, wherein the instructions are further operable to receive the request from a route guidance application.

25. A system comprising:
one or more processors;
and a memory coupled to the processors comprising instructions executable by the processors, the processors operable when executing the instructions to: receive a request for a route from a first geolocation to a second geolocation;
calculate the route from the first geolocation to the second geolocation;
access a social graph comprising a plurality of nodes and a plurality of edges connecting the nodes, and each node corresponding to an object associated with a social network, wherein a geolocation associated with a user corresponds to a particular node of the social graph;
identify one or more logged paths of the user that coincide with at least a portion of the route, wherein one or more of the logged paths comprise the geolocation associated with the user;
update one or more navigation instructions for the route based on the identified logged paths of the user; and
displaying the updated navigation instructions on a display of a client device of the user.

26. The system of claim 25, wherein the instructions are further operable to determine the logged paths based on location data of the user.

27. The system of claim 25, wherein the instructions are further operable to replace navigation instructions corresponding to the portion of the route with instructions of the identified logged paths.

28. The system of claim 26, wherein the instructions are further operable to poll a mobile computing device of the user to obtain the previous location data.

29. The system of claim 26, wherein the location data comprises global positioning system (GPS), cellular triangulation, or wireless hotspot data received from a mobile computing device of the user.

30. The system of claim 25, wherein a remainder of the route comprises turn-by-turn directions.

31. The system of claim 25, wherein the particular node comprises a node associated with a check-in by the user.

32. The system of claim 25, wherein the particular node comprises a node associated with information of the user.

33. The system of claim 25, wherein identifying one or more logged paths is based at least in part on an identifier of the user.

34. The system of claim 25, wherein the instructions are further operable to access a data store for the logged paths.

35. The system of claim 25, wherein the instructions are further operable to identify a highest ranked logged path based on a frequency that each of the logged paths is traveled by the user.

36. The system of claim 25, wherein the instructions are further operable to receive the request from a route guidance application.

* * * * *